US006766404B1

(12) United States Patent
Osaka et al.

(10) Patent No.: US 6,766,404 B1
(45) Date of Patent: Jul. 20, 2004

(54) BRANCH BUS SYSTEM FOR INTER-LSI DATA TRANSMISSION

(75) Inventors: Hideki Osaka, Oiso (JP); Akira Yamagiwa, Oiso (JP); Kenichi Ishibashi, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/568,055

(22) Filed: May 10, 2000

(30) Foreign Application Priority Data

May 13, 1999 (JP) .......................................... 11-132334

(51) Int. Cl.[7] .................................................. G06F 1/00

(52) U.S. Cl. ...................................... 710/306; 710/307

(58) Field of Search ................................ 710/305–307, 710/309, 313, 104, 105, 107, 110; 326/30

(56) References Cited

U.S. PATENT DOCUMENTS 5,548,226 A * 8/1996 Takekuma et al. ............ 326/30
5,568,063 A * 10/1996 Takekuma et al. ............ 326/30
5,663,661 A * 9/1997 Dillon et al. ................. 326/30
5,668,834 A * 9/1997 Takekuma et al. ............ 326/30
6,125,419 A * 9/2000 Umemura et al. .......... 710/306
6,188,237 B1 * 2/2001 Suzuki et al. ................. 326/30
6,441,639 B1 * 8/2002 Takekuma et al. ............ 326/30
6,515,503 B2 * 2/2003 Griffin et al. ................. 326/30

* cited by examiner

*Primary Examiner*—Paul R. Myers
*Assistant Examiner*—Raymond N Phan
(74) *Attorney, Agent, or Firm*—Antonelli, Terry, Stout & Kraus, LLP

(57) ABSTRACT

A fast transfer bus system capable of fast data transfer with no reflection at branch points. Four LSIs having constant-impedance interfaces are connected via two variable resistors each having three signal terminals. A variable impedance LSI is connected between these variable resistors. When the LSIs connected to the variable resistor do not work as a bus driver, three variable resistance elements in each variable resistor are set to have a value of ⅓ of the characteristic impedance Zo of connection lines, and are connected in a Y-letter shape. When one of LSIs connected to the variable resistor works as a bus driver, the values of the variable resistance elements are set to low impedance or Zo.

10 Claims, 14 Drawing Sheets

TRANSITION TABLE OF CONTROLLER 50

| d1 | d2 | ra | rb | rc |
|---|---|---|---|---|
| L | L | ro | ro | ro |
| L | H | rh | rl | rl |
| H | L | rl | rh | rl |
| H | H | ro | ro | ro |

ro=Zo/3
rh=Zo
rl<5 [ohm]

FIG. 5A
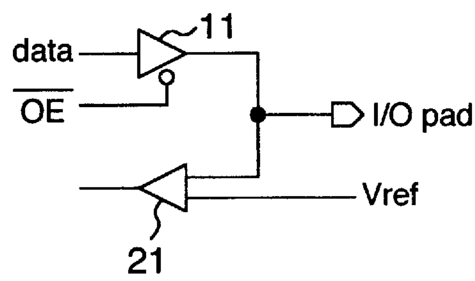
FIG. 5B
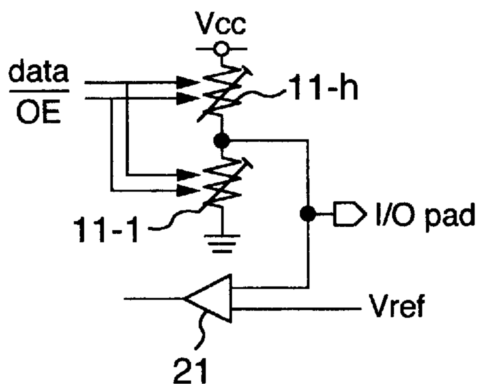
FIG. 5C
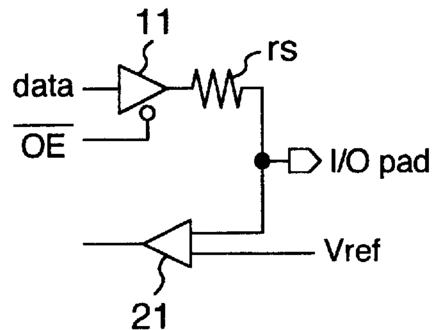
FIG. 6
| data | $\overline{OE}$ | Rhi | Rlo | Vio(*) |
|---|---|---|---|---|
| 0 | 0 | 5k | 50 | 0.0V |
| 0 | 1 | 100 | 100 | 0.5V |
| 1 | 0 | 50 | 5k | 1.0V |
| 1 | 1 | 100 | 100 | 0.5V |
* no load v(datain)
v(a1)
v(b1)
v(c1)
v(d1)
v(e1)
V
1
0.8
0.6
0.4
0.2
0
2e-09
4e-09
6e-09
8e-09
1e-08
TIME 1
b
d1
d2
50
DIRECTION CNTL
55c
IMPEDANCE CNTL
32w
16w
8w
4w
2w
w
rb
55b
IMPEDANCE CNTL
c
rc
ra
IMPEDANCE CNTL
55a
a

BRANCH BUS SYSTEM FOR INTER-LSI DATA TRANSMISSION

CROSS-REFERENCE TO RELATED APPLICATION

This application relates to U.S. patent application Ser. No. 08/874721 filed on Jun. 13, 1997 and assigned to the present assignee. The content of the application is incorporated herein by reference.

BACKGROUND OF THE INVENTION

The present invention generally relates to technologies for signal transmission between devices such as a multiprocessor and a memory in an information processor (e.g., between digital circuits formed of, for example, CMOSs or between the functional blocks using the same), and particularly to a fast bus transmission technology for high-speed data transfer through a bus between a plurality of LSIs connected on the same transmission line.

As a bus system for fast data transfer between a number of nodes as in the multiprocessor, there is an SSTL (Stub Series terminated Transceiver Logic) (EIA/JESD8-8) interface based on JEDEC (Joint Electron Device Engineering Council) standard. This interface, as shown in FIG. 2, is a bus system for use in transmission between LSIs that include input/output interfaces having receivers 21~25 for receiving data and drivers 11~15 for transmitting data. A data bus line (main line) 3 is terminated at both ends with a terminal resistor Rtt for matching so that the reflection at both ends can be removed. In addition, matching resistors 31~35 are respectively provided on stub lines 61~65 that connect the main line 3 and the interface circuits. The matching resistors 31~35 act to suppress the reflected waves due to impedance mismatching between the main line and the associated stub line when one of the drivers 11~15 transmits data.

In the SSTL interface shown in FIG. 2, however, a reflected wave due to impedance mismatching occurs on the signal waveform propagated on the main line 3, disturbing high-speed operation. That is, for example, in FIG. 2, when data is transmitted from driver 11 to receiver 25, the signal waveform from the driver 11 passes through the stub 61 and matching resistor 31 and arrives at the main line 3. In general, the resistance value of the matching resistor 31 can be determined from the characteristic impedance Zo of stub 61 and the characteristic impedance Zo' of main line 3 as given by the following equation (1).

$$Rm=Zo-Zo'/2 \tag{1}$$

where Rm is the matching resistance 31. The equation (1) is the matching termination condition viewed from the stub side toward the main line. If the characteristic impedances Zo', Zo of main line 3 and stub 61 are, for example, 50Ω, respectively, Rm is determined as 25Ω=50−50/2.

On the other hand, the signal waveform transmitted from the driver 11 and arrived at the main line 3 further propagates to the left and right on the main line 3. The waveform that progresses to the left terminates at the terminal resistor Rtt and thus there is no reflected wave. However, the signal to the right passes branch points 52~55. The reflection coefficient Γ at the branch point 52 is given by the following equation (2).

$$\Gamma=(Z1-Zo)/(Z1+Zo) \tag{2}$$

where Z1 is the resultant impedance of the stub 62 including the main line 3 and matching resistor 32, and given by the following equation (3).

$$Z1=(Zo'(Rm+Zo))/(Zo'+Rm+Zo)=30\Omega \tag{3}$$

Thus, since the reflection coefficient Γ is 0.25 at branch point 52, 25% of the signal power is reflected at the point.

In other words, when the data from the driver 11 passes each of the branches on the main line 3, 25% of the data is reflected at each branch and superimposed on the data. Since this reflected wave occurs during the round trip propagation delay of stub 61~65, it is necessary to limit the stub line length in order that noise can be reduced for fast transmission. That is, a great restriction is imposed on the interface structure.

SUMMARY OF THE INVENTION

It is a first object of the invention to reduce the disturbances of impedance at these branch points, thereby decreasing the noise due to the reflected waves. Thus, it is possible to make much faster operation than SSTL.

It is a second object of the invention to reduce the restrictions on the stub line lengths from the LSI to each blanch point on the main line. Thus, it is possible to provide a greater freedom to the interface structure than SSTL.

It is a third object of the invention to incorporate the terminal resistors necessary for the high-speed bus within the LSIs instead of those on the main line, thereby reducing the mounting area.

The terminal resistors are built in the interface circuits of the LSIs so that the signals propagated on the stub lines can be prevented from being reflected from the interfaces. In addition, variable resistance elements are connected in series with the lines from each of the branch points on the main line. When the LSI receives data or does not transmit/receive data, the variable resistance element connected to the stub line with the LSI joined is made to be ⅓ of the characteristic impedance Zo of the line. When the LSI works as a driver, the variable resistance element connected through that stub line to the LSI is made to have a value of as low as about 5Ω or below, the resistance element connected to the main line is set to have a low value, and the other resistance element is matched with the characteristic impedance Zo of the line.

Thus, when the LSI receives data or does not transmit/receive data, at the branch point, all lines appears to be completely matching-terminated since the resistance elements connected through the stub lines to the LSIs are set to be ⅓ of the characteristic impedance of the line. Therefore, since there is no reflection at the branch point, data can be transferred without noise.

In addition, when the LSI works as a driver, since the variable resistance element connected through the stub line to the LSI is set to have a value of as low as about 1Ω, the element connected to the main line to have a low value and the other element to have the characteristic impedance of the line, about 80% of data can be propagated from the driver to the main line, and about 40% of the data, when transmitted to the other variable resistor, can be propagated with no reflection, thus the signal level being kept large enough.

BRIEF DESCRIPTION OF THE DRAWINGS

FIGS. 5A, 5B and 5C show interface circuits in the first embodiment.

FIG. 6 is a transition table of the controller in the first embodiment.

DESCRIPTION OF THE EMBODIMENTS

The first embodiment will be described with reference to FIG. 1.

Figure 1:
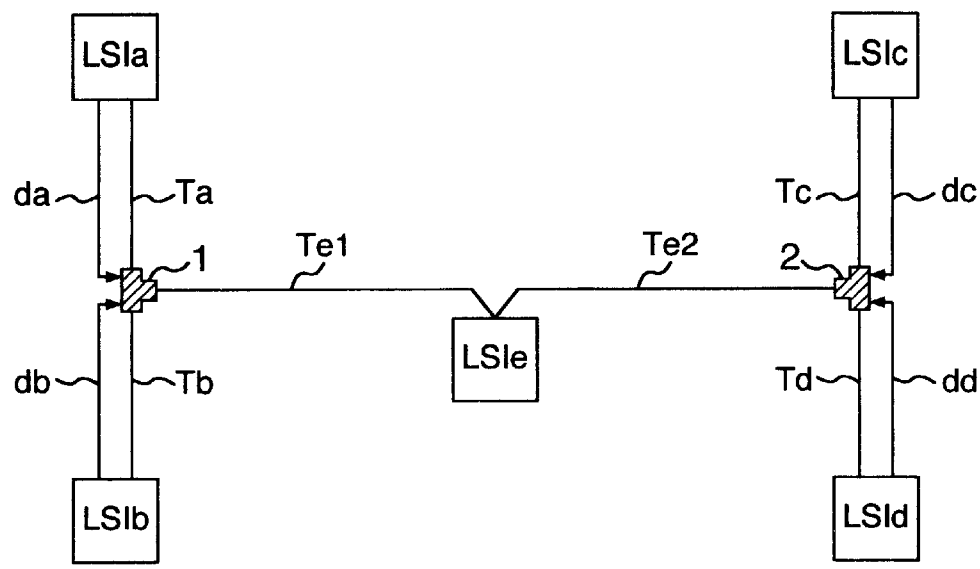
FIG. 1 is a diagram for explaining the first embodiment.

The five LSIa~LSIe in FIG. 1 are interconnected through conductive lines and variable resistors in order to transmit and receive data. There are shown the variable resistors 1, 2. The LSIa and the variable resistor 1 are connected by the line Ta, the LSIb and the variable resistor 1 by the line Tb, the LSIc and the variable resistor 2 by the line Tc, the LSId and the variable resistor 2 by the line Td, and the LSIe and the variable resistors 1, 2 by the lines Te1, Te2.

The lines da~dd are control signal lines for controlling the variable resistors 1, 2.

The LSIa~LSIe each have an interface formed of a driver and receiver for transmitting and receiving data not shown in FIG. 1. The wiring shown in FIG. 1 shows the connection between these interfaces and includes mutual connection buses having lines as same as the bit width of address or data.

The construction of variable resistors 1, 2 will be described with reference to FIG. 3.

The variable resistor 1*a* has signal input/output terminals a~c, and the terminals a~c are interconnected by variable resistors ra~rc in a Y-letter shape. The variable resistors ra~rc are controlled in their resistance values by a controller 50. The resistance controller 50 is controlled through terminals d1 and d2.

The terminals a~c of this variable resistor 1*a*, when applied to the resistor 1, are respectively connected to the lines Ta, Tb and Te1 as shown in FIG. 1. The terminals d1 and d2 are connected to lines da and db, respectively.

Similarly, the terminals a~c of the variable resistor 2 are respectively connected to the lines Tc, Td and Te2. The terminals d1 and d2 are connected to lines dc and dd, respectively.

Figures 3, 4:
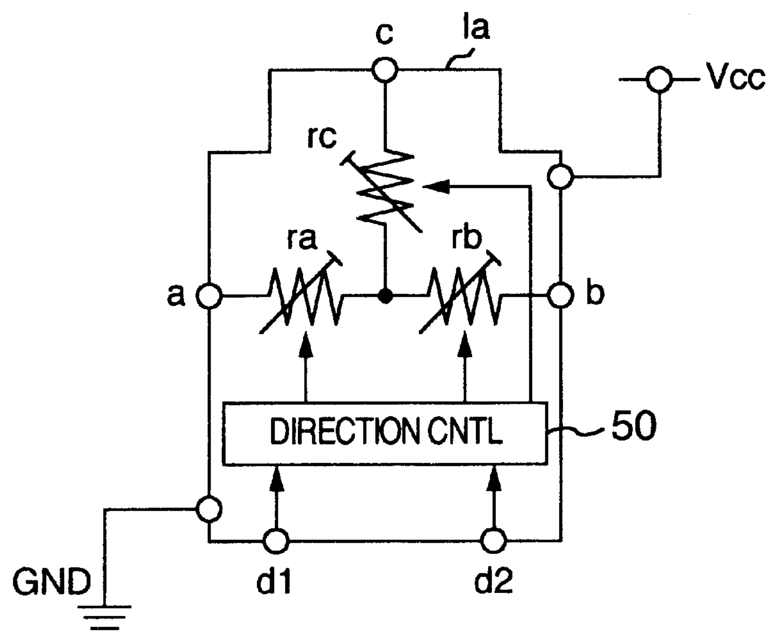
FIG. 3 is a diagram to which reference is made in explaining the first embodiment.
FIG. 4 is a transition table of the controller in the first embodiment.

The values of the variable resistors ra~rc are changed by control signals d1, d2 as shown in FIG. 4. In FIG. 4, d1 and d2 are expressed in positive logic, and H represents control signal ON.

On this table, when the lines Ta, Tb and Te1 in FIG. 1 have the same characteristic impedance Zo, ro is ⅓ of Zo. In addition, rh is characteristic impedance Zo and r1 is a low resistance value of 5Ω or below.

When the control signals d1 and d2 are both L or H, the resistance values ra~rc are ⅓ of the characteristic impedance of the connected lines. Thus, those resistors work as a kind of power splitter. In this case, the reflection coefficients Γ1 on the lines are calculated to be "0". The voltage transmission coefficient T1 is "½".

The reason for the reflection coefficient Γ1=0 is as follows. The lines Ta, Tb and Te1 of impedance Zo are connected to the resistors ra, rb and rc, respectively. The impedance viewed from the line Ta is the resistance ra of ⅓·Zo plus a parallel circuits of lines Tb of Zo plus resistors rb of ⅓·Zo , and Tc of Zo plus rc of ⅓·Zo . Thus, the impedance is ⅓·Zo+½(⅓·Zo+Zo)=Zo, which is the same as the characteristic impedance of the line Ta. The result is Γ1="0".

The reason for the voltage transmission coefficient T1=½ is as follows. If the point at which the resistors ra~rc are joined is called the joint point, the voltage waveform propagated from the stub line Ta arrives at this joint point, and the voltage at this joint point becomes ⅔ of the incident voltage as a divided voltage for the resistor of ⅓·Zo.

In addition, in order to find the transmission voltage on the line Tb, let us evaluate the voltage ratio of line Tb from the voltage at the joint point. The voltage dividing ratio in the series connection of the resistor rb=⅓·Zo and the characteristic impedance Zo of line Tb is ¾=(Zo/(⅓+1)Zo). The voltage ratio is the product of this value and the voltage ratio ⅔ at the joint point. The result is that the voltage transmission coefficient is ½(=⅔·¾).

Since the reflection coefficient Γ1 is 0, if the control signals d1, d2 have the same value, the variable resistor 1*a* functions as a power splitter, and thus the voltage wave can be transmitted on the respective lines with no reflection.

If any one of the control signals d1 and d2 is H, the resistors ra~rc are controlled so that the signal flows input from the terminals a~c can be changed. When d1 is H, the resistors ra and rc become low resistance r1, and resistor rb becomes rh. Thus, a path from terminal a to terminal c is connected with low resistance (2r1). On the other hand, a path between the terminals a and b is connected with a high resistance (r1+rh).

Let us calculate the reflection coefficient Γ2 viewed from the line Ta and the transmission coefficient T2 to the line Tb.

Assume the resultant resistance of lines Tb and Te1 is r0, which is viewed from the joint point of resistors ra~rc, ro is given by $$ro=(r1+Zo)//(Zo+rh) \quad (4)$$

where the symbol "//" is an operator for parallel connected resultant resistance, and defined as a//b=(ab)/(a+b). Therefore, the reflection coefficient Γ2 viewed from line Ta can be calculated as $$\Gamma 2=(r1+r0-Zo)/(r1+r0+Zo)=(2rhr1+r1^2+2r1Zo-Zo^2)/((r1+Zo)(2rh+r1+3Zo)) \quad (5)$$

Substituting rh=Zo in the equation (5) and rearranging under the condition of Zo>>r1 will yield the following equation (6).

$$\Gamma 2\approx-(Zo-4r1)/(5Zo+6r1) \quad (6)$$

If r1=0, the reflection coefficient is Γ2=−0.2.

Similarly, the transmission coefficient T2 is calculated from the following equation (7).

$$T2=(Zo(r1+Zo))/(2rhr1+r1^2+rhZo+3r1Zo+Zo^2) \quad (7)$$

Substituting rh=Zo in the equation (7) and rearranging the equation under the condition of Zo>>r1 will yield $$T2=(Zo(r1+Zo))/(r1^2+5r1Zo+2Zo^2)-(r1+Zo)/(5r1+2Zo) \quad (8)$$

If r1=0, the transmission coefficient T2 is ½, which is equal to T1.

Moreover, the voltage transmission coefficient T3 to the line Te1 is given by the following equation (9).

$$T3=(1+\Gamma 2)(Zo/(Zo+r1)) \quad (9)$$

If r1=0, the coefficient is T3="0.8".

In other words, if either d1 or d2 is H, the resistors ra~rc are controlled in their resistance. If the terminal d1 is H, the terminals a and c are connected with a low resistance. Thus, the transmission coefficient T2 on the path from terminal a to terminal b is about ½, and the coefficient T3 is 0.8. If the terminal d2 is H, the terminals b and c are connected with a low resistance. The coefficient T2 on the path from terminal b to terminal a is about ½, and the coefficient T3 is 0.8.

In this way, the variable resistor 1*a* is controlled by the control signals d1 and d2 so that the signal propagation direction can be controlled with a low reflection coefficient. In addition, even though the resistors ra~rc are connected in a delta Δ shape instead of the Y-letter shape, fundamentally the same functions can be achieved.

The interface circuit built in the LSIa~LSId shown in FIG. 1 will be described with reference to FIGS. 5A, 5B and 5C.

Referring to FIG. 5A, There is shown the element 11 which is a driver with output enable (OE_N). When the OE_N of the driver is asserted, the data is output from terminal "data". There is also shown the element 21 which is a receiver and works as a comparator for comparing the voltage at terminal Vref and the voltage at an I/O PAD. The compared result is supplied to the core logic within the LSI. The I/O PADs within the LSIs are respectively connected to the lines Ta~Td shown in FIG. 1.

The driver 11 and receiver 21 are connected at the I/O PAD, and connected through the LSI package (not shown) to the external lines.

Although the output impedance of the driver 11 can be adjusted to equal to the impedance Zo of the line on which the driver is connected, the output impedance viewed from the I/O PAD is constant even during driving or even when the output enable (OE_N) is negated. In other words, the output impedance of the driver 11 can be adjusted, and the output voltage is changed, thus producing a signal, while the output impedance is kept constant. In this case, the impedance of the line connected to the driver 11 is 50[Ω] for the sake of convenience, and thus the output impedance is fixed to 50[Ω]. Therefore, the waveform to the driver is not reflected therefrom, and thus the noise can be reduced.

This driver 11 will be described with reference to FIG. 5B. FIG. 5B is a more detailed circuit diagram of the equivalent circuit of the driver 11 shown in FIG. 5A.

In FIG. 5B, there is shown an element 11-h which is formed of a MOS transistor connected between the I/O PAD and power supply Vcc, and which is, in this figure, shown as a variable resistor. There is also shown an element 11-1 which is formed of a MOS transistor connected between the I/O PAD and ground, and which is, in FIG. 5B, shown as a variable resistor. These variable resistors 11-h, 11-1 are controlled by the data signal and OE_N signal.

FIG. 6 shows the resistance values (Rhi, Rlo) of the variable resistors 11-h and 11-1 controlled by the data signal and OE_N signal, and the voltage (Vio) at the I/O PAD.

When data=0 and OE_N=0, L is output from the driver, the output impedance of the driver is Rlo=50[Ω], and the output voltage is Vio=0 [V]. When data=0 and OE_N=1, the output from the driver is cut off and the output impedance of the driver is the parallel connection of Rlo=100[Ω] and Rhi=100[Ω], that is, 50[Ω] and the output voltage is Vio=0.5 [V] under Vcc=1.0 [V]. When data=1 and OE_N=0, H is output from the driver, the output impedance of the driver is Rhi=50[Ω], and the output voltage is Vio=1.0 [V]. When data=1 and OE_N=1, the output from the driver is cut off, the output impedance of the driver is the parallel connection of Rio=100[Ω] and Rhi=100[Ω], that is, 50[Ω], and the output voltage is Vio=0.5 [V] under Vcc=1.0 [V].

Thus, even if the data and OE_N take any values, the output impedance is always 50[Ω]. The output voltage changes to Vio (H)=1.0 [V] or Vio (L)=0 [V] depending on the data status, and changes to Vio=0.5 [V] when no driver output.

With this construction, the I/O interface has the impedance of 50[Ω] even when the driver is in any condition, and this impedance is equal to the impedance of the line connected to the driver 11. Therefore, since there is almost no reflection at the I/O interface, data can be transferred with little waveform distortion. FIG. 5C shows the equivalent model in the LSIe shown in FIG. 1.

When the OE_N is negated, the driver exhibits high impedance. When the OE_N is asserted, the output impedance is Rs=Zo/2. When the driver has no load, the driver drives with the amplitude of the Vcc-ground voltage 1.0 [V]. When two transmission lines of 50[Ω] are connected to the driver, the signal amplitude is half of the Vcc-ground voltage, or 0.5 [V].

Figure 7:
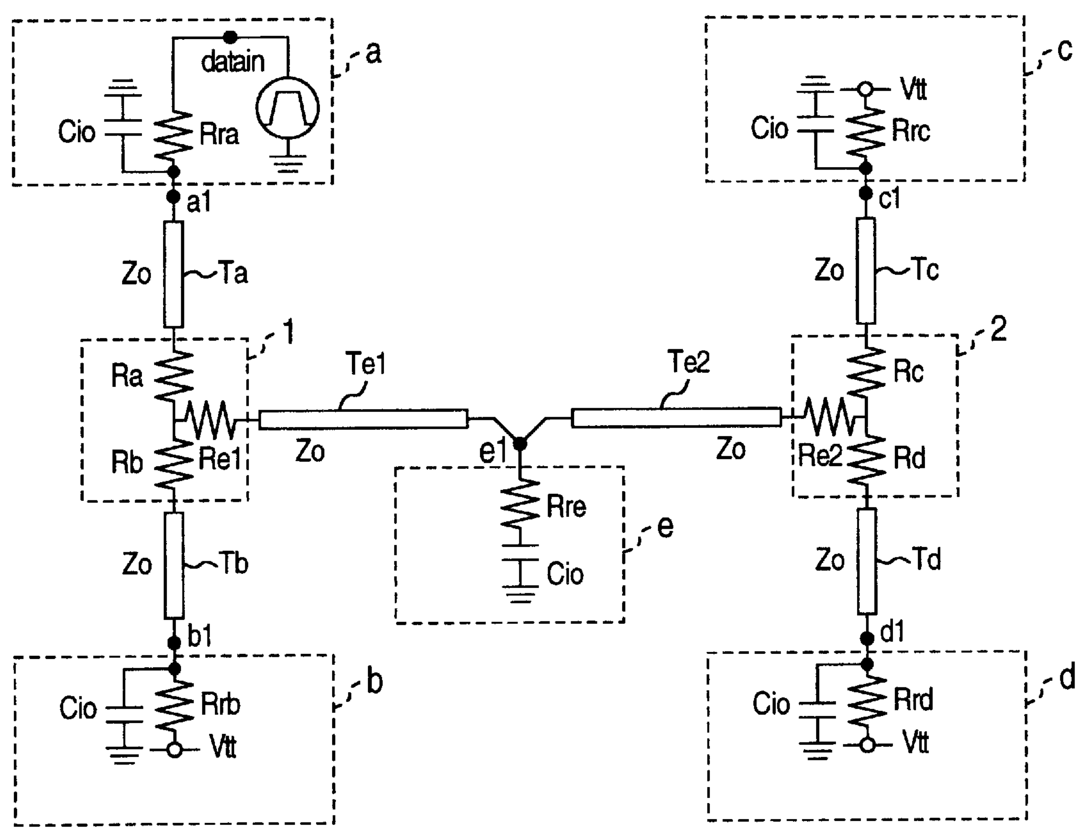
FIG. 7 shows a simulation equivalent circuit of the first embodiment.

FIGS. 8~11 and FIGS. 13~15 show the waveforms on the bus line system of FIG. 1 which uses the variable resistor 1*a* of FIG. 3 and the interfaces of FIGS. 5A~5C. The waveforms of these figures are the results of circuit simulation called SPICE (Simulation Program with Integrated Circuit Emphasis). FIG. 7 shows the simulation circuit.

Referring to FIG. 7, the dotted blocks a~d are the equivalent circuits of the interface circuits, and respectively have resistor Rra~Rrd and electrostatic capacitance Cio connected in parallel. In FIG. 7, the driver is the interface a in which the resistor Rra is connected at node datain with a pulse source. The other interfaces b~d are equivalent circuits which do not drive the signal, but are in the state in which the signal is received. In other words, the equivalent circuits, in which those interfaces have impedances Rrd~Rrd=Zo and are connected to the power supply Vtt, respectively.

There are shown transmission line models indicated by Ta~Td. The variable resistors 1, 2 are expressed by the equivalent circuits that have three Y-joint resistors Ra, Rb, Re1 and Rc, Rd, Re2, respectively.

The variable resistors 1, 2 are connected by other transmission line models that are indicated by Te1, Te2 as equivalent circuits.

In addition, the model corresponding to LSIe of FIG. 1 is provided between the transmission lines Te1, Te2, and formed of electrostatic capacitance Cio and resistance Rre. This simulates that the interface of LSIe in FIG. 1 is different from the interfaces of LSIa~LSId in that it has impedance of HiZ.

The nodes corresponding to the pins of LSIa~LSIe are represented by a1~e1, respectively.

The impedance of each element is as follows, and the driver a supplies a control signal to the variable resistor 1, making the terminal d1 level H as shown in FIG. 4. In addition, the variable resistor 2 has terminals d1 and d2 both not supplied with the control signal.

Impedances Zo of transmission lines Ta~Td,

Te1, Te2=50[Ω]

Impedances Rra~Rrd of interfaces a~d=50[Ω]

Impedance Rre of interface e=1 K[Ω]

Impedances Ra, Re1 of variable resistor 1=0[Ω]

Impedance Rb of variable resistor 1=50[Ω]

Impedances Rc, Rd, Re2 of variable resistor 2=50/3[Ω]

Moreover, the lengths of transmission lines Ta~Td are 50 [mm], and the lengths of transmission lines Te1, Te2 are 100 [mm]. The electrostatic capacities Cio of interfaces a~e are all 2 pF. The rise time and fall time of the driver are 0.5 [ns].

Figure 8:
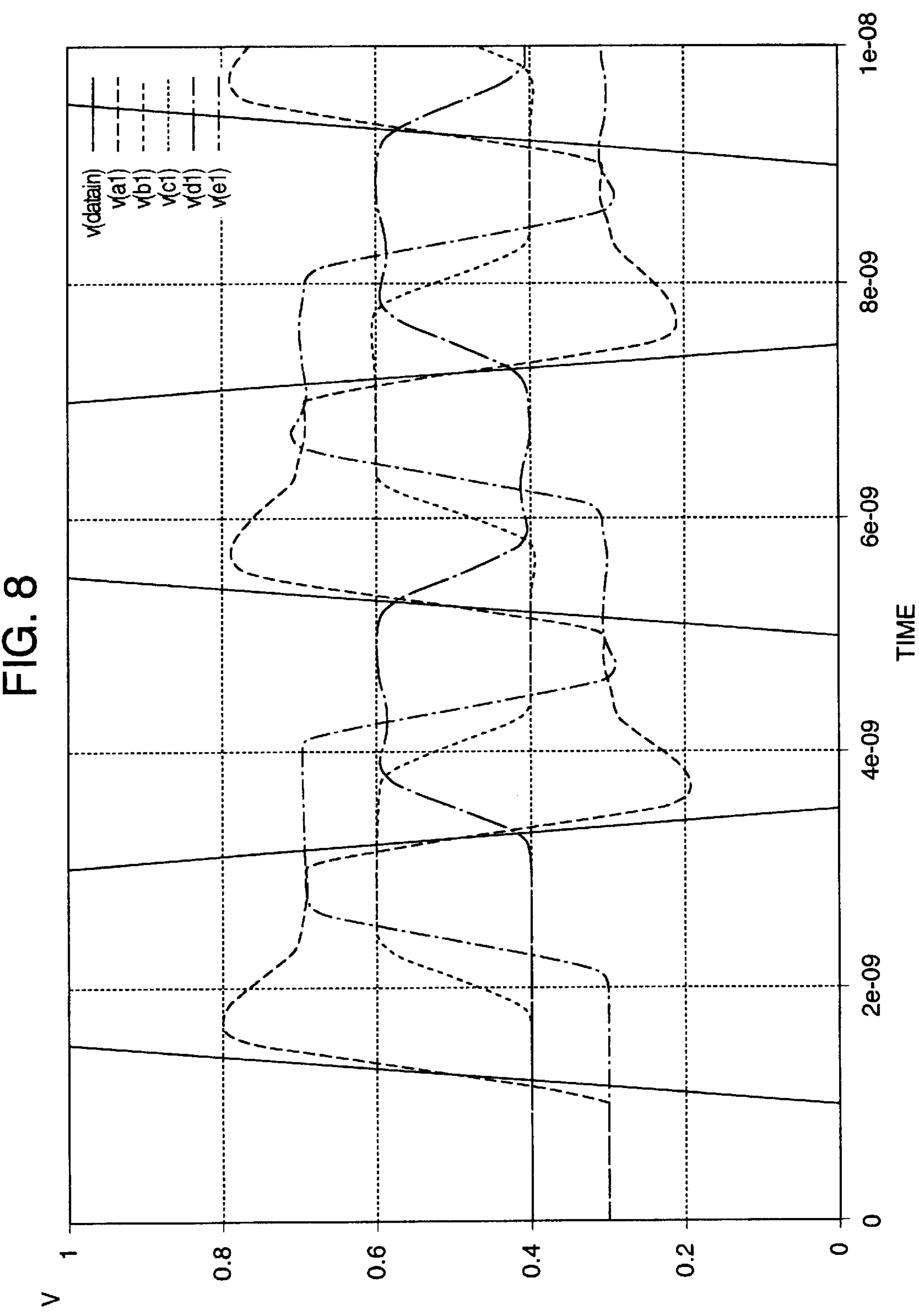
FIG. 8 shows simulation waveforms in the first embodiment.

FIG. 8 is a graph showing simulation waveforms in the circuit of FIG. 7. The abscissa indicates time [sec], and the ordinate the magnitude of voltage [V].

In FIG. 8, the solid line indicates the drive waveform at datain, which is a pulse having amplitude of 0 V–1 V and width of 2 ns. The data transfer speed is 500 [MT/s] (Mega Transaction per Second). The broken line, dotted line, fine dotted line, one-dot chain line and bold one-dot chain line indicate voltage waveforms at nodes a1, b1, c1, d1 and e1, respectively.

From the figure, it will be seen that the waveforms at receiving points b1~e1 are extremely smooth rectangular waves. In addition, the waveform at driving point a1 has the leading and trailing edges changing around about 0.5 [V] that is determined by the voltage dividing ratio between the impedance Rra=50[Ω] of the driver and the impedance Zo=50[Ω] of the transmission line Ta. However, 20% of the progressive wave is reflected back to the driver side due to the 20% impedance mismatching of the variable resistor 1. This reflected wave is 0.1 [V]=0.5 [V]×0.2, causing overshoot of about 0.1 [V]. However, this 20% reflected wave is not again reflected back from the driver because the transmission line Ta is terminated with the matchable driver. In this case, only during the rise time, the signal is again reflected due to the electrostatic capacitance Cio of the interface a. The impedance Zc of this electrostatic capacitance is 1/(j*ω*Cio) where j is the square root of −1, and ω is the angular frequency. Since the rise time tr is now 0.5 [ns] and ω=2π/tr, the reflection coefficient of the electrostatic capacitance and resistor 50[Ω] connected in parallel is calculated as Γ=−0.1−j0.3. The reflection coefficient Γ causes only a small delay, thus not much disturbing the waveform.

The amplitudes of the voltage waveforms at pin positions b1~e1 of the interfaces b~e are about ½ that of the voltage waveform at the driver, and change within ±0.2 [V] relative to the terminal voltage 0.5 [V]. The amplitude at node e1 is 0.4 [V] for the following reason. The progressive wave from the driver a, after passing through the variable resistor 1, is propagated at transmission coefficient T3=0.8 and thus has an amplitude of 0.4 [V] since the progressive wave is controlled to pass the low resistance as shown in FIG. 4. In addition, the impedance is not disturbed since Rre is 1 K[Ω].

The differential circuit used in a C-MOS gate array can fully discriminate the amplitude change of ±0.2 [V]. Also delaying is caused at receiving points b1~e1 due to the length difference between the lines provided from the driver.

Thus, the waveform from the driver a can be fast transmitted with less distortion to the receiving points b1~e1 at which its amplitudes are about half that of the waveform at node a1 of the driver.

Figure 9:
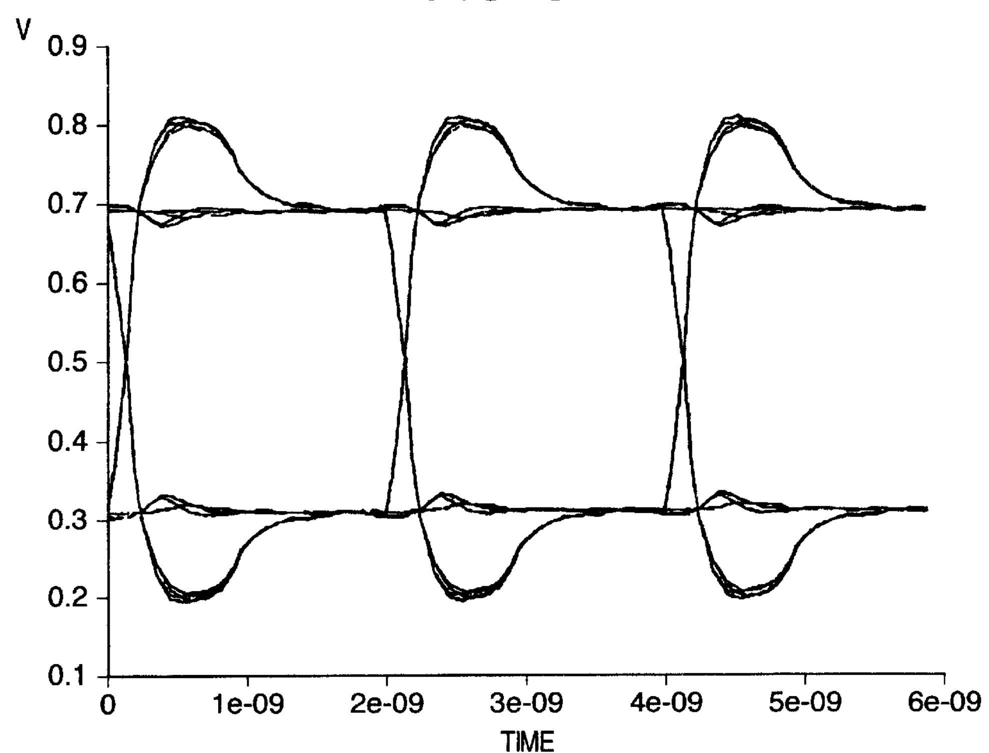
FIG. 9 shows simulation waveforms in the first embodiment.
Figure 10:
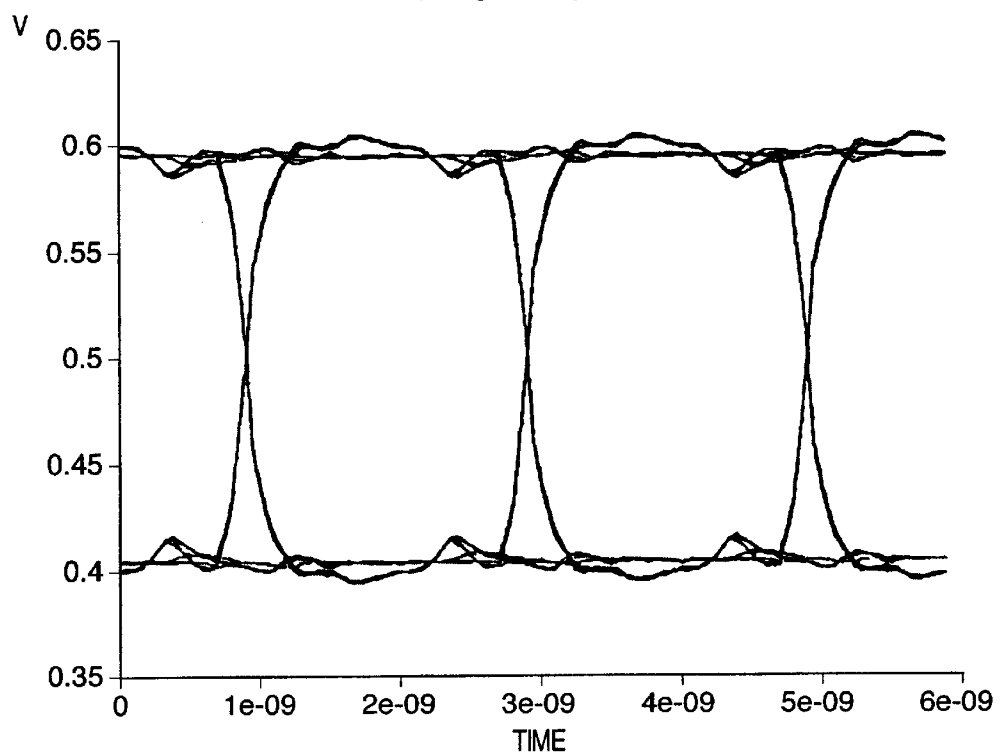
FIG. 10 shows simulation waveforms in the first embodiment.
Figure 11:
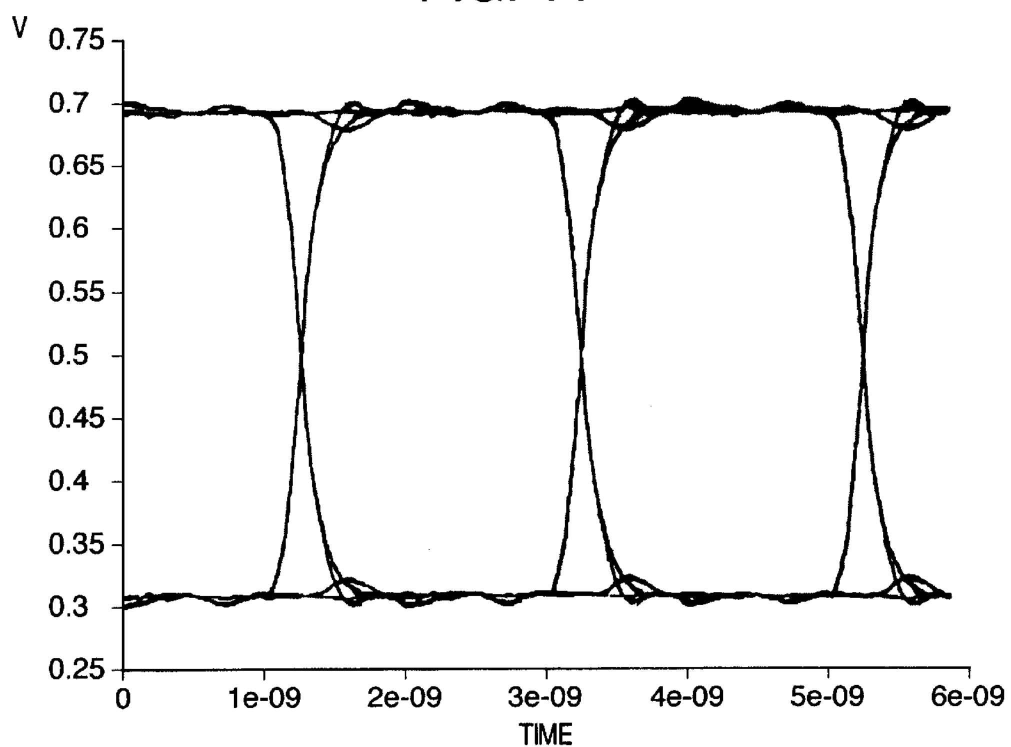
FIG. 11 shows simulation waveforms in the first embodiment.

When the bus lines are constructed to have a high transfer rate so that the data propagation time can be reduced to about the data pulse width or below, interference between data, or so-called intersymbol interference is caused. FIGS. 9 and 10 show the waveforms obtained after subjecting the pulse at datain to pseudo random processing, and making the same simulation.

FIG. 9 shows the repeated superimposition of the waveform at drive point a1, or the so-called eye pattern. FIG. 10 shows the eye pattern at node b1, and FIG. 11 the eye pattern at node e1. Since the waveforms shown in FIGS. 10 and 11 include noise of as extremely small as 50 [mV] or below and have almost no change of the intersections between the leading and trailing edges, jitter due to the intersymbol interference is very small. Therefore, data can be transferred at a rate of 500 [MT/s] without problem.

Although the LSIa works as a driver in FIG. 7, the same waveforms can be obtained even when any one of LSIb~LSId works as a driver, because they are symmetrically arranged. In this case, the states of the variable resistors 1 and 2 are assumed to change according to the table shown in FIG. 4 depending on the driver position.

Figure 12:
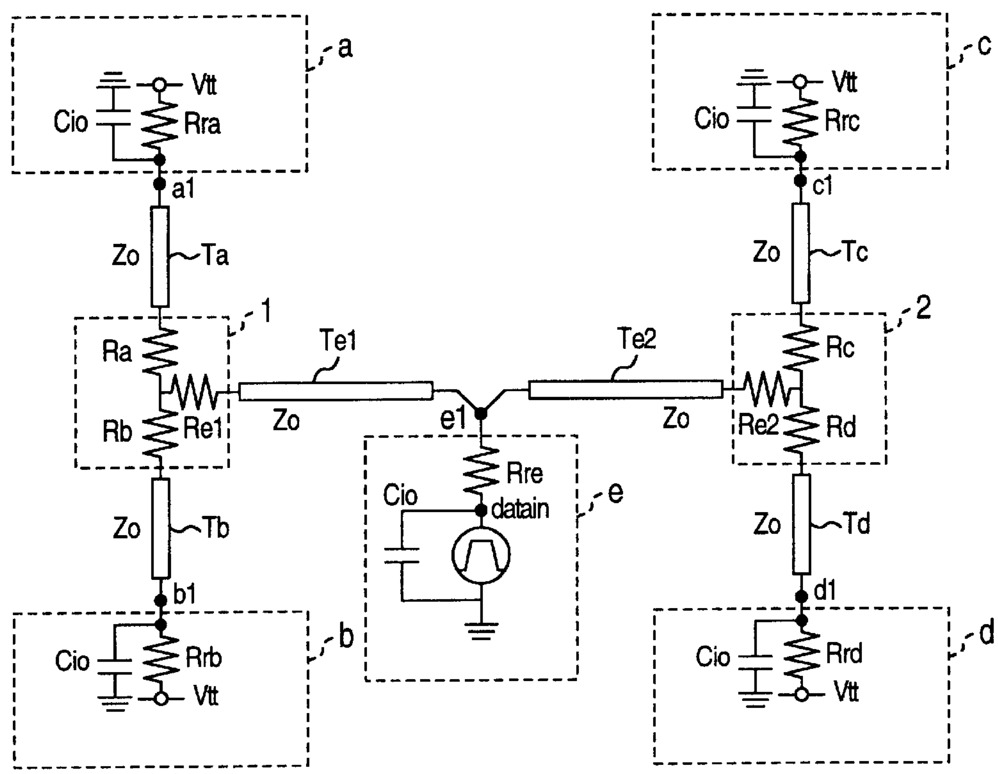
FIG. 12 shows a simulation equivalent circuit of the first embodiment.

The LSIe then works as a driver, and simulation is performed for that case. FIG. 12 shows the equivalent circuit. The circuit arrangement shown in FIG. 12 is different from that in FIG. 7 in that the interface a works as a receiver, Rra=50[Ω] is connected to Vcc and the interface e has its Rre connected to the pulse source. The pulse source shown in FIG. 12 generates the same waveform as that of the interface a shown in FIG. 7 although it is connected to a different node. The output impedance Rre of the interface e is half of the characteristic impedance Zo of lines Te1, Te2, or 25[Ω]. Since the two lines are connected in parallel, the apparent line impedance viewed from the interface e is half of the characteristic impedance of each line. In addition, the resistance values of the resistors within each of the variable resistors 1 and 2 are all Zo/3.

Figure 13:
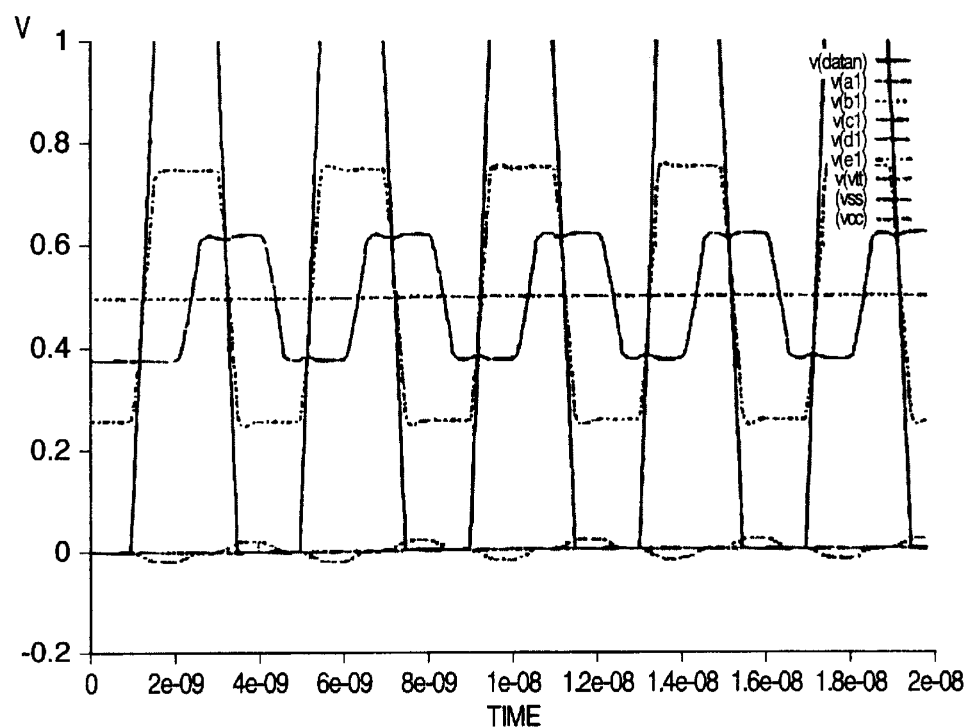
FIG. 13 shows simulation waveforms in the first embodiment.

FIG. 13 shows the simulation waveforms when interface e drives in FIG. 12. The waveform at node datain is a 500 [MT/s] pulse of 0–1 [V] as indicated by the solid line. The one-dot chain line indicates the waveform having an amplitude of 0.5 [V] at node e1. The waveforms at nodes a1~d1 are superimposed because the line lengths from the interface e to those nodes are equal. These waveforms are rectangular waves of which the amplitudes are 0.5 [V]±0.125 [V], and have very small noise. This is because the variable resistors 1 and 2 together with the transmission lines Ta~Td connected thereto terminate with their matching conditions being all completely satisfied when seen from the transmission lines Te1 and Te2.

Figure 14:
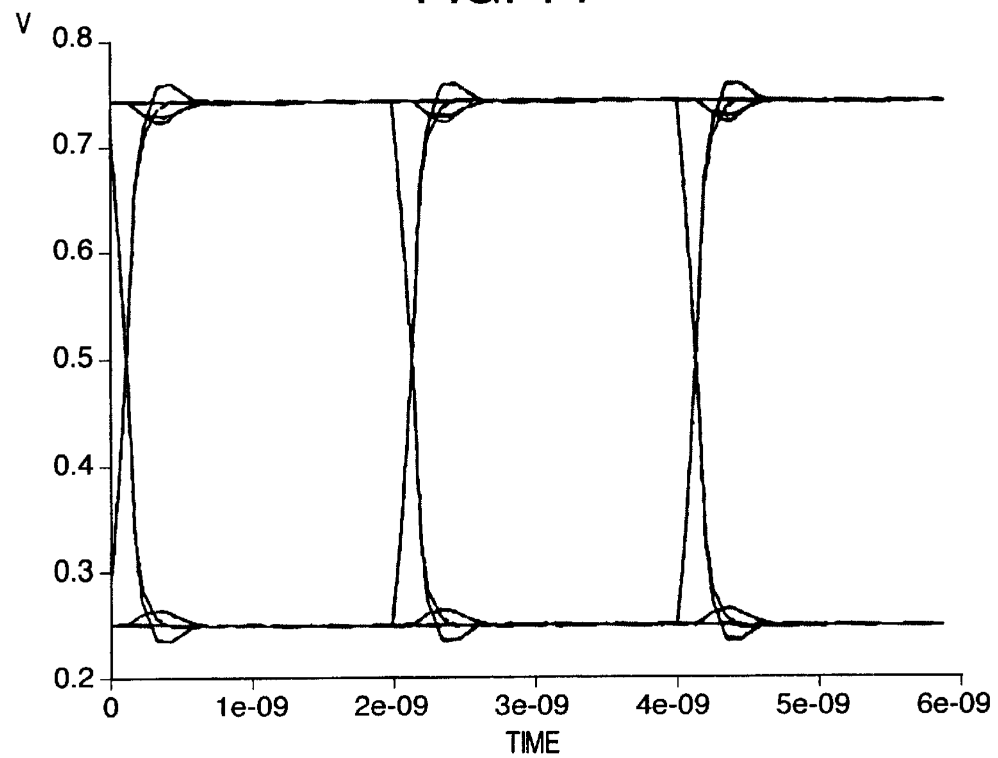
FIG. 14 shows simulation waveforms in the first embodiment.
Figure 15:
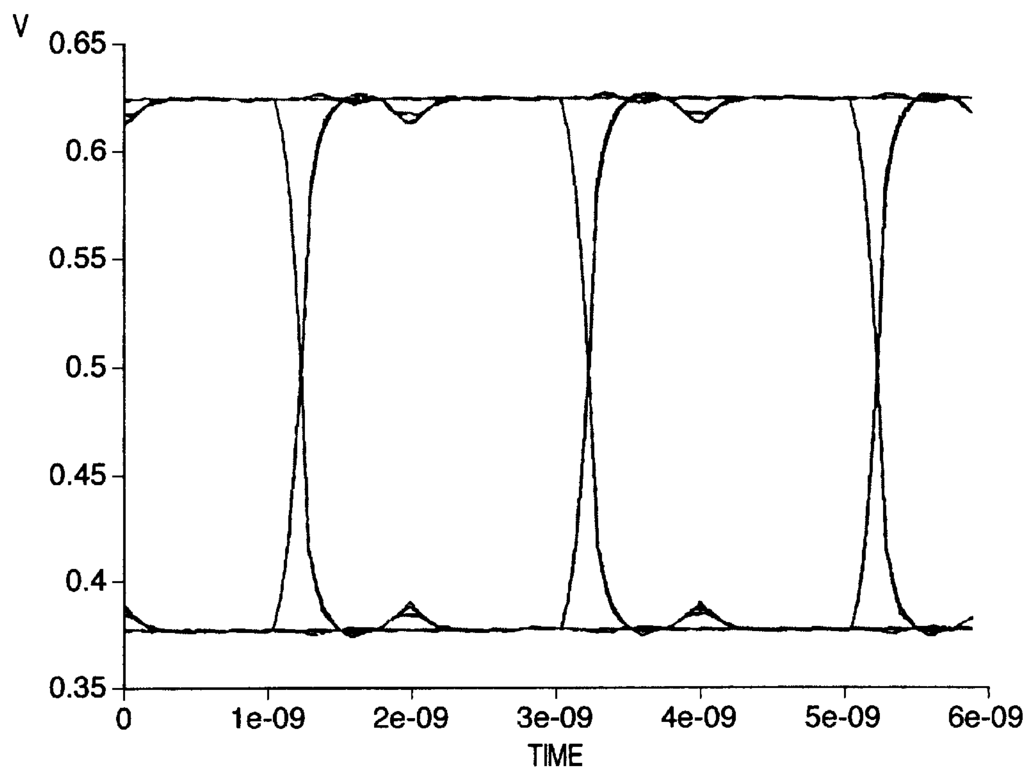
FIG. 15 shows simulation waveforms in the first embodiment.

FIGS. 14 and 15 show the eye patterns at nodes e1 and a1. From the figures, it will be understood that the noise and jitter can be decreased more than those shown in FIGS. 9~11. Therefore, by using the interface e as a driver it is also possible to fast transfer data with low noise.

Thus, when a bus line system is constructed even with either one of LSIa~LSIe used as a driver as shown in FIG. 7 or 12, fast data transfer can be performed with low noise. Consequently, it is possible to provide apparatus having the fast data transfer function according to the invention.

Moreover, according to the principle of operation, if the lines connected between the variable resistors 1, 2 and LSIa~LSId are respectively provided to have a length with negligible loss and constant characteristic impedance, waveforms with low distortion can be transmitted without limiting the line lengths. Thus, the lengths of lines Ta~Td as stub lines shown in FIG. 1 are fundamentally not limited. That is, since the line lengths are not limited, the circuit arrangement can be designed with freedom.

Figure 2:
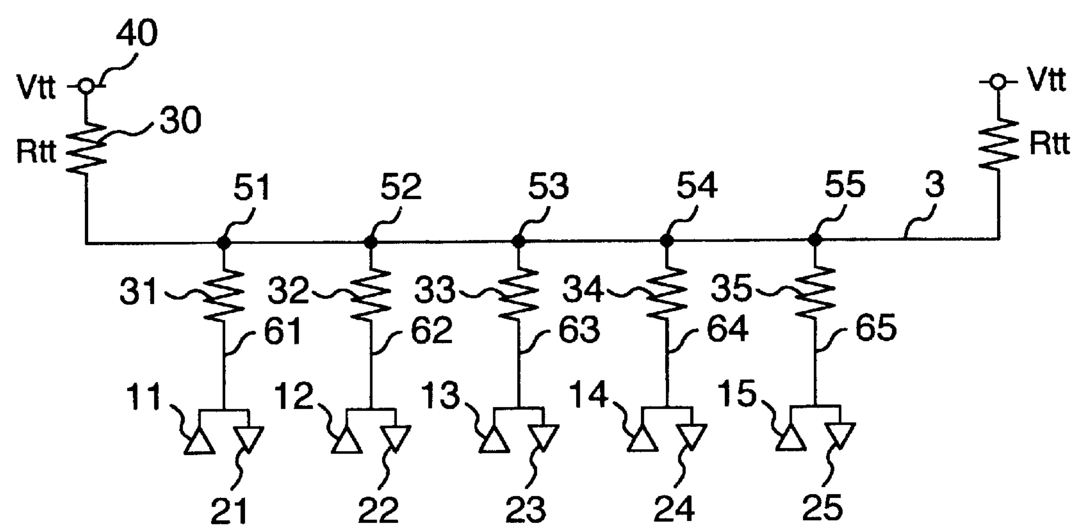
FIG. 2 is a wiring diagram of the prior art (SSTL).

In addition, the terminal resistance 30 at the ends of the line shown in FIG. 2 is not necessary, and thus the mounting area can be made smaller.

Figure 16:
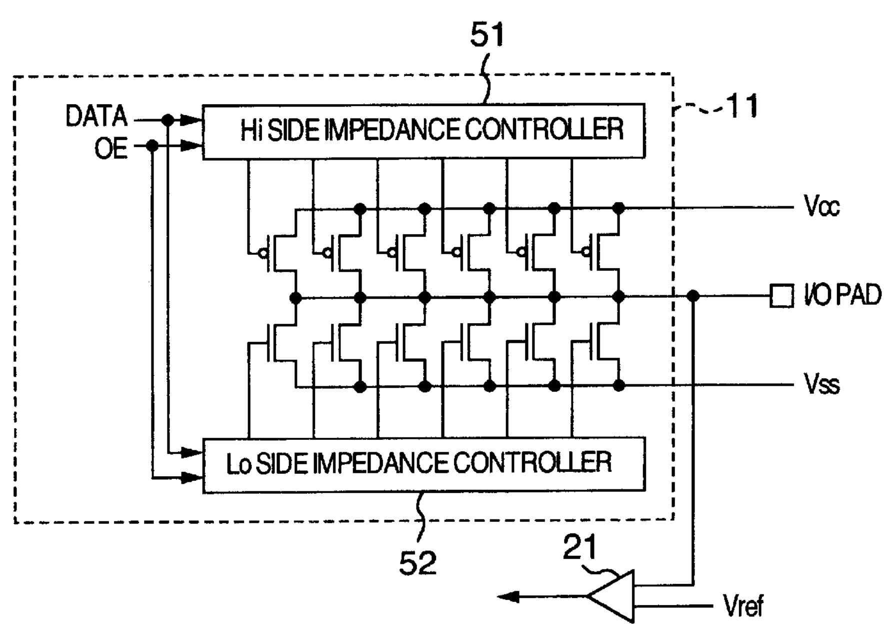
FIG. 16 is a diagram useful for explaining the first embodiment.

A constant-impedance interface capable of achieving non-reflection matching terminals as the second embodiment will be described with reference to FIG. 16. The interface shown in FIG. 16 employs CMOSs for controlling the output impedance and output voltage Vio shown in FIG. 6. FIG. 16 shows the details of the driver 11 illustrated in FIG. 5A.

The dotted-line block 11 is a driver of which the output impedance is changed by data terminal and data output control terminal (OE_N). The element 21 is a receiver, which shares I/O pad with the driver 11. The receiver compares the received signal passed through the I/O pad with the reference voltage Vref, thereby detecting that data is H or L.

The driver 11 is a push-pull type totem pole with parallel P-MOSs and parallel N-MOSs. The P-MOSs are connected at one ends to the power supply Vcc and at the other ends to the I/O pad. The N-MOSs are connected at one ends to ground Vss and at the other ends to the I/O pad. Their gate voltages are controlled by driver impedance controllers 51, 52, respectively. Although the potential of Vcc is selected to be 1.0 [V] in order to achieve the function shown in FIG. 6, it may be arbitrarily selected depending on the selected devices, usable power supply of feeder system or sensitivity of receiver. That is, it may be over 1.0 [V] or below 1.0 [V].

The impedance controllers 51, 52 respond to signals from terminals "data" and OE_N to control the gate voltages of the P-MOSs and N-MOSs so that the driver 11 can change the output impedance and output voltage. One example of the controllers will be described with reference to FIG. 17.

Figure 17:
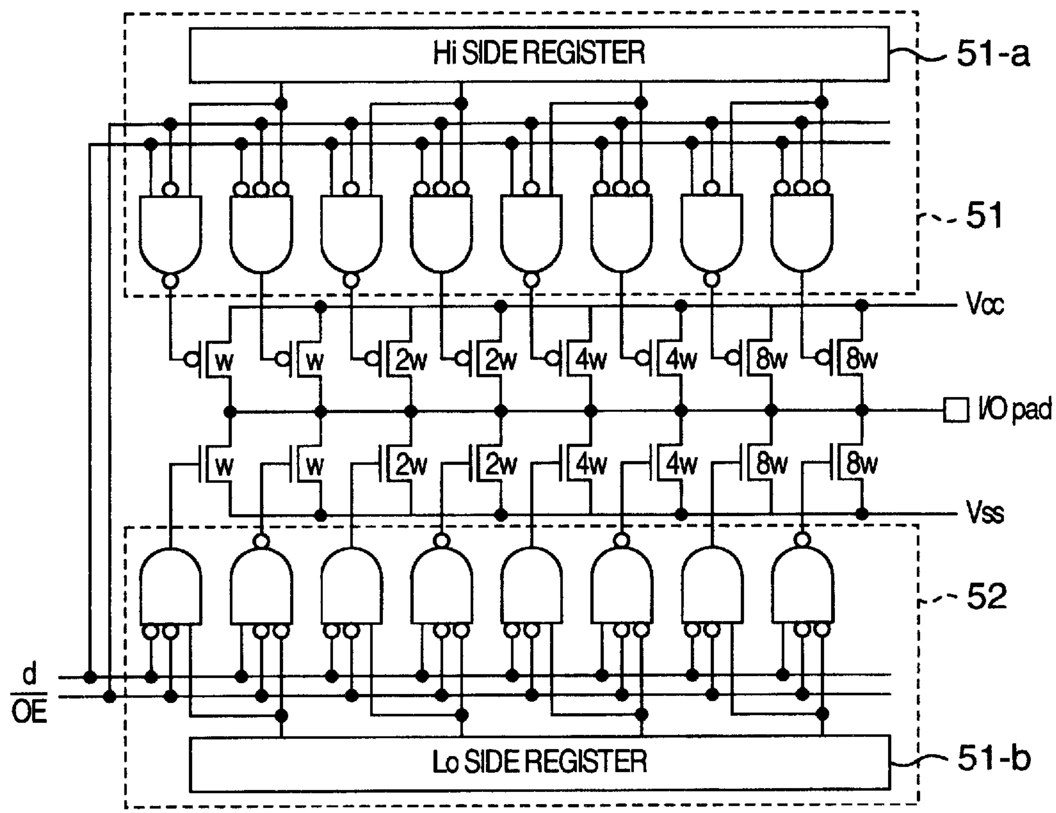
FIG. 17 is a diagram useful for explaining the first embodiment.

Referring to FIG. 17, the output stage of the driver has pairs of two parallel N-MOS transistors and two parallel P-MOS transistors, in which the transistors in one pair have the same gate width and the gate widths of the respective pairs are W, 2W, 4W, 8W where W is the gate width of the first pair, and the pairs are connected in parallel.

The register 51-*a* is provided to set the impedances of the P-MOS transistors on H side. The impedances are controlled by choosing a combination of a plurality of pairs of transistors of which the gate widths are w, 2w, 4w and 8w.

In other words, the impedance can be discretely changed from one unit when the impedance of transistors of which the gate widths are equally w is selected as a unit, to 15 units by the combinations of the pairs of which the gate widths are different. Similarly, the register 51-*b* is provided to set the impedances of the N-MOS transistors on L side. The impedances are controlled by choosing a combination of a plurality of pairs of transistors of which the gate widths are w, 2w, 4w and 8w. In FIG. 17, the registers 51-*a*, 51-*b* are set with the impedances to twice of the characteristic impedance Zo=50[Ω] of the transmission lines with which interfaces are connected, or 100[Ω].

As illustrated in FIG. 17, AND gates and NAND gates are connected to receive the setting signals from the registers 51-*a*, 51-*b*, and the signals from nodes "data" and OE_N. The P-MOS transistors and N-MOS transistors are controlled by those gates to achieve the impedances and output voltages shown in FIG. 6.

If the nodes "data " and OE_N are at levels H and L, respectively, all the N-MOSs are in the off state. The twice P-MOS transistors as many as transistors selected by the impedance controller 51 are made in the On state. In other words, the gate width of the P-MOS transistors which are set to 100[Ω] is doubled so that the impedance becomes half of that, or 50[Ω]. The output voltage at I/O pad is Vcc=1.0 [V] with no load. When a line with characteristic impedance of 50[Ω] is connected thereto, 0.5 [V] is produced which is determined by the resistance dividing ratio of ½.

When the node OE_N is at level H, or when the output is cut off, the P-MOS transistors of the combinations of transistors selected by the impedance controller 51 are made in the On state. That is, the resultant impedance of the P-MOSs is 100[Ω]. The N-MOS transistors of the combinations of transistors selected by the impedance controller 52 are also made in the On state. That is, the resultant impedance of the N-MOSs is 100[Ω]. Thus, the output impedance is half of that, or 50[Ω]. The output voltage is half of the Vcc-ground voltage, or 0.5 [V].

The arrangement shown in FIG. 17 can control the output impedance and output voltage only by C-MOS transistors. Thus, those transistors can be simply built in an LSI. It also provides the interfaces having the equivalent circuits shown in FIG. 7.

A method of achieving the impedance controller provided in each of the LSIa~LSIe will be described with reference to FIG. 18. A high-precision resistor Rarg is provided on the outside of an LSI, and connected between Vcc and I/O pad. This I/O pad is connected to the same kind of cell as the driver shown in FIG. 17. This I/O pad is further connected to the comparator-type receiver 21, which compares the voltage from the pad with the voltage Vref and supplies the compared result to an impedance controller 53. If the Rarg and Vcc are selected to be 100[Ω] and 1.0 [V], respectively, the impedance controller 53 can selectively change the gate widths of N-MOS transistors, and thereby monitor whether the voltage according the voltage dividing ratio of the Rarg to driver 11 is larger than Vref. The impedance controller 53 can make the N-MOS transistors of driver 11 turn on so that the gate width can be sequentially increased from the minimum width w, thereby decreasing the impedance. When the impedance is equal to or below the value of Rarg, the output of the receiver 21 inverts, and at this time this transition point can be monitored. Moreover, when the gate width of transistors is sequentially decreased from the maximum width, the impedance of the driver can be increased. When the impedance is equal to or above the value of Rarg, the output of the receiver 21 inverts, and at this time the transition point can be monitored. It will be found that the target Rarg can be determined by the two transition points. Thus, by employing either one of the two transition points, it is possible to set the impedance of the driver 11 with the minimum error in Rarg and with Vds=0.5 [V] where Vds is the source-drain voltage of driver 11 in FIG. 18. In addition, the set impedance is written in the impedance control register 51-*b* shown in FIG. 17 in the other drivers, so that the written L-side impedance of all drivers can be set to 100[Ω].

Similarly, a cell with Rarg connected to I/O pad and ground is prepared, and the P-MOSs of the cell are sequentially selected so that the impedance equal to Rarg can be determined with the minimum error. Moreover, the set impedance is written in the impedance control register 51-*a* shown in FIG. 17 in the other drivers, so that the written H-side impedance of all drivers can be set to 100[Ω].

The above impedance setting can be made when the system is turned on or performed at intervals of, for example, 5 minutes during which the temperature can be considered constant.

The impedance can be set to the target 100[Ω] by providing the impedance controller in the LSI as in this embodiment. Consequently, it is possible to remove error of impedance due to the scattering of characteristics at the time of manufacturing and temperature distribution.

Figure 19:
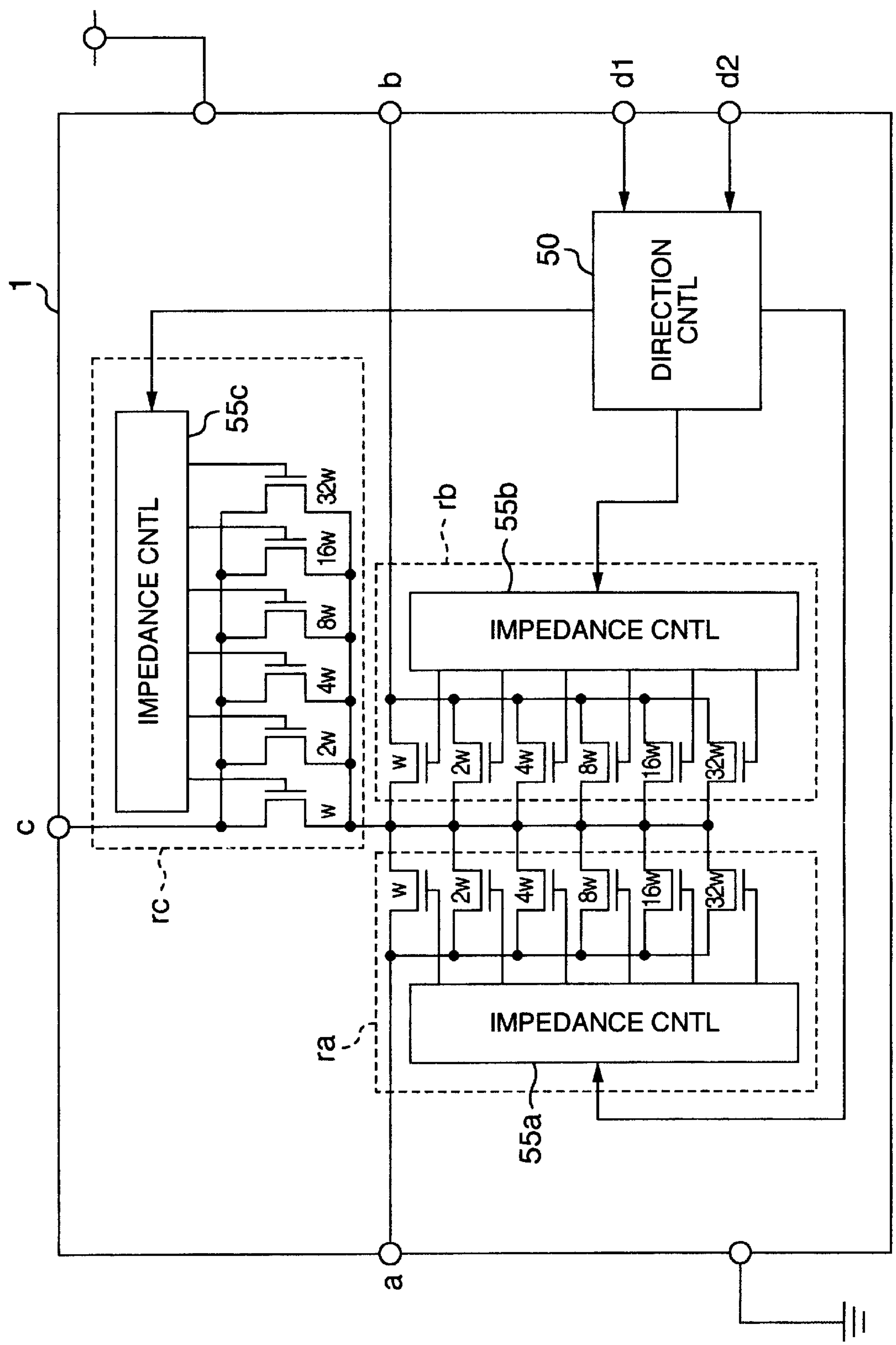
FIG. 19 is a diagram for explaining the second embodiment.

The variable resistor 1 of the third embodiment will be described with reference to FIG. 19. FIG. 19 shows an example of a variable resistor 1 shown in FIG. 1, which is constructed by MOS transistors. The impedances among terminals a~c are controlled by impedance controllers 55*a*~55*c*. The variable resistance elements ra~rc are each implemented by connecting transistors of different gate widths in parallel and combining these transistors to control the resultant impedance. As illustrated in FIG. 19, six MOS transistors of which the gate widths are w, 2w, 4w, 8w, 16w and 32w, respectively, are connected in parallel. The impedance controllers 55*a*~55*c* are controlled to change the impedances of the variable resistance elements ra~rc by the direction controller 50 that is connected to terminals d1 and d2. The resistance values ra~rc are changed according to the states of terminals d1 and d2 as shown in FIG. 4. FIG. 4 shows three values for each of the resistances ra~rc, or low resistance value r1, high resistance value rh (=Zo) and a value r0 (=Zo/3) corresponding to the line impedance.

The low resistance value r1 shown in FIG. 4 means low resistance, or means that all transistors are in On state. The high resistance rh is equal to the characteristic impedance Zo of the lines connected to the variable resistor 1, or 50[Ω] in the first embodiment. The r0=Zo/3 can be achieved by three times combination as many as the gate width of MOS transistors for 50[Ω].

Figure 18:
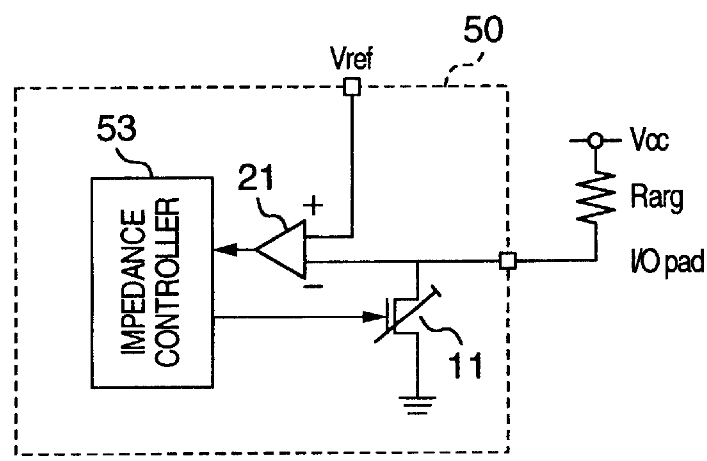
FIG. 18 is a diagram useful for explaining the first embodiment.

The impedance controllers can be simply constructed by using the same circuit as shown in the second embodiment of FIG. 18. In this case, since the target impedance is 50[Ω], the value of Rarg is selected to be 50[Ω].

The high resistance rh can be achieved by performing the impedance setting of FIG. 18 with the impedance controllers 55*a*~55*c*.

Although N-MOS transistors are shown in FIG. 19, parallel P-MOSs and parallel N-MOSs may be connected or only P-MOSs may be connected. The types of transistors can be determined according to whether the controllers 55*a*~55*c* can make the transistors shift to predetermined impedances when source voltage Vcc is supplied to the variable resistor 1.

Figure 20:
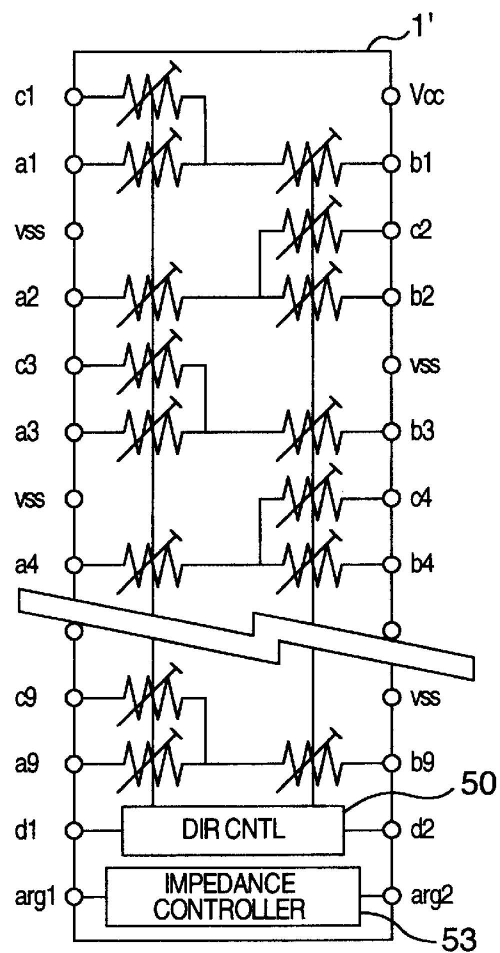
FIG. 20 is a diagram for explaining the second embodiment.

The variable resistors within three terminals can be collected as a group as shown in FIG. 20, thereby reducing the mounting area. As illustrated in FIG. 20, the variable resistor group has 9-bit structure and each of the variable resistors is controlled by control signals from the direction controller 50 and impedance controller 53. Although the number of pins used is increased in the arrangement of FIG. 20, provision of ground (Vss) between the variable resistors permits the crosstalk between bits to be reduced. The number of Vss pins can be also reduced for the decrease of total pin number.

In addition, when a data signal is sent from the LSIa having a constant-impedance interface, the timing of supplying the resistance control signal d1 to the variable resistor 1 is advanced earlier by the time necessary for the resistance values to shift as shown in FIG. 4 than when the data signal is transmitted, thereby assuring the transition of resistance values and the stable data transfer. Of course, after data transfer, the control signal da should be negated. When the bus system of the invention is applied to, for example, multiprocessor bus, the bus can be usually snooped (detected in status) because of content coincidence (coherency) in the cache memory of the processor. The reason for this is that the LSIa~LSIe are in the receiving state. That is, the present invention can be applied to multiprocessor bus.

Thus, high-precision impedance control can be realized by use of inexpensive MOSs. Moreover, since the multi-bits structure is possible, the mounting area can be reduced.

The fourth embodiment will be described with reference to FIG. 21. Four connectors 70-*a*~70-*d* are mounted on a printed circuit board 100. The connectors 70-*a*~70-*d* and LSIe are connected by the variable resistors 1, 2 and a line 3. Impedance control signal lines (not shown in FIG. 21) connects between the connectors 70-*a*~70-*d* and the variable resistors 1, 2. In other words, the impedance control signal is supplied from the connectors 70-*a*, 70-*b* to the variable resistor 1, and from the connectors 70-*c*, 70-*d* to the variable resistor 2.

Figure 21:
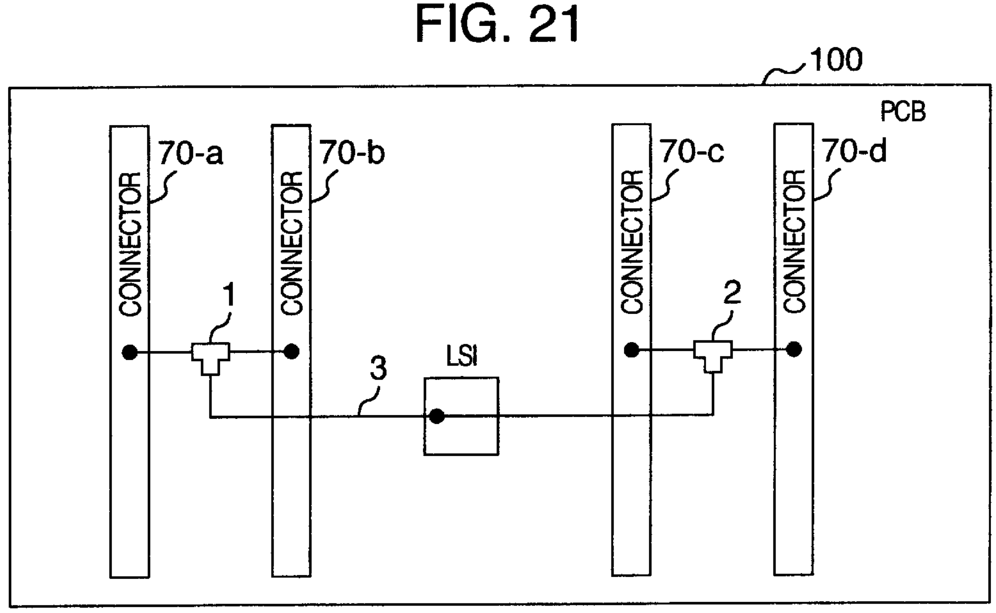
FIG. 21 is a diagram for explaining the second embodiment.
Figure 22:
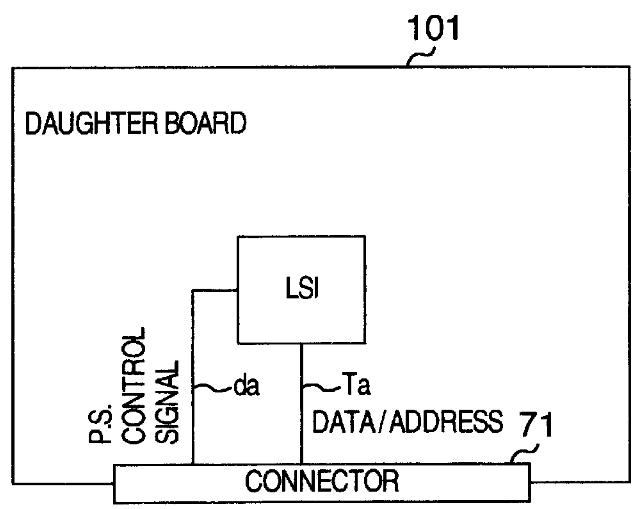
FIG. 22 is a diagram for explaining the second embodiment.

FIG. 22 shows a detachable daughter board 101 that can be put into or drawn out from the connectors 70-*a*~70-*d* shown in FIG. 21. The connector 71 of the daughter board 101 can be inserted in the connectors 70-*a*~70-*d*. A data/address signal Ta and a control signal da for controlling the resistor 1 or 2 shown in FIG. 21 are supplied from an LSI to the connector 71. The LSI shown in FIG. 22 includes an interface having the impedance shown in FIG. 6. The LSI shown in FIG. 21 has an interface which exhibits half of the characteristic impedance of the line 3 at the time of driving, and high impedance at the time of receiving.

The arrangement shown in FIG. 22 makes it unnecessary to provide terminal resistors on the lines, thus reducing the mounting area. In addition, since the daughter boards can be connected and disconnected via the connectors, high-function LSIs such as processors can be changed in accordance with the performance of the system. This also means that broken daughter boards can be replaced. Moreover, when all four daughter boards 101 are not necessary to mount together, terminal board for terminating Vtt with 50[Ω] is required instead. The absence of the terminal boards will break the terminated states.

Figure 23:
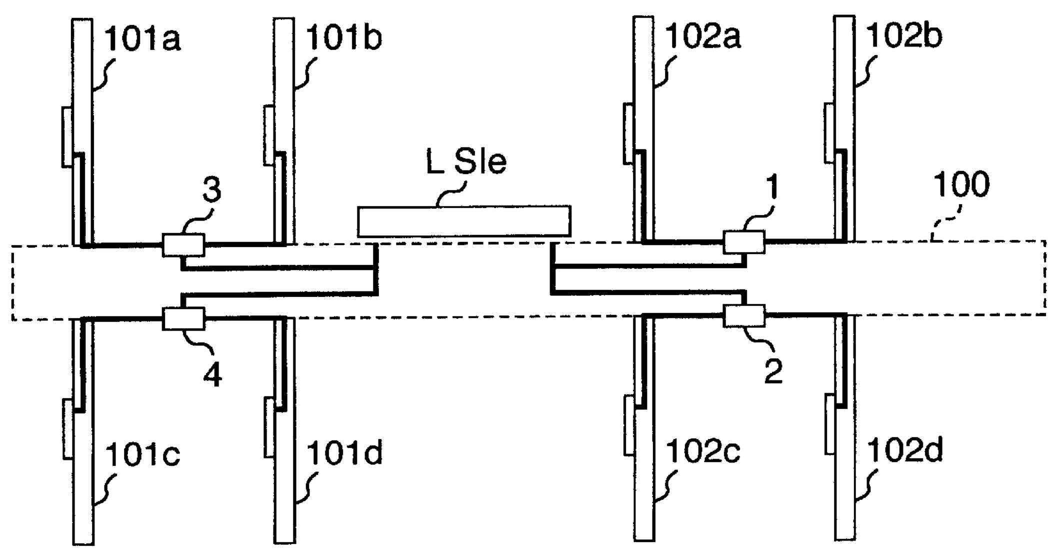
FIG. 23 is a diagram for explaining the second embodiment.

The daughter boards can also be mounted on both sides of the circuit board 100 by providing lines as shown in FIG. 23. FIG. 23 is a cross-sectional view of the circuit board with daughter boards 101*a*~101*d* mounted on the front and back sides. The daughter boards 101*a*, 101*b* are mounted on the left-hand side of the front surface, and a variable resistor 3 is provided on the front side at the central position between those daughter boards. The daughter boards 101*c*, 101*d* are mounted on the left-hand side of the back surface, and a variable resistor 4 is provided on the back side at the central position between those daughter boards. Two signal lines as two layers separated by ground/power supply layers are provided in the main circuit board so that the LSIe can be connected between the variable resistors 3, 4, thereby building up the same bus system as in the first embodiment. This second bus system can be provided on the other side of the LSIe. The daughter boards 102*a*~102*d* connected to the second bus and the daughter boards 101*a*~101*b* can share the signal layers.

As illustrated in FIG. 23, two buses can be provided in the same size circuit board 100, thus improving the system function.

Figure 24:
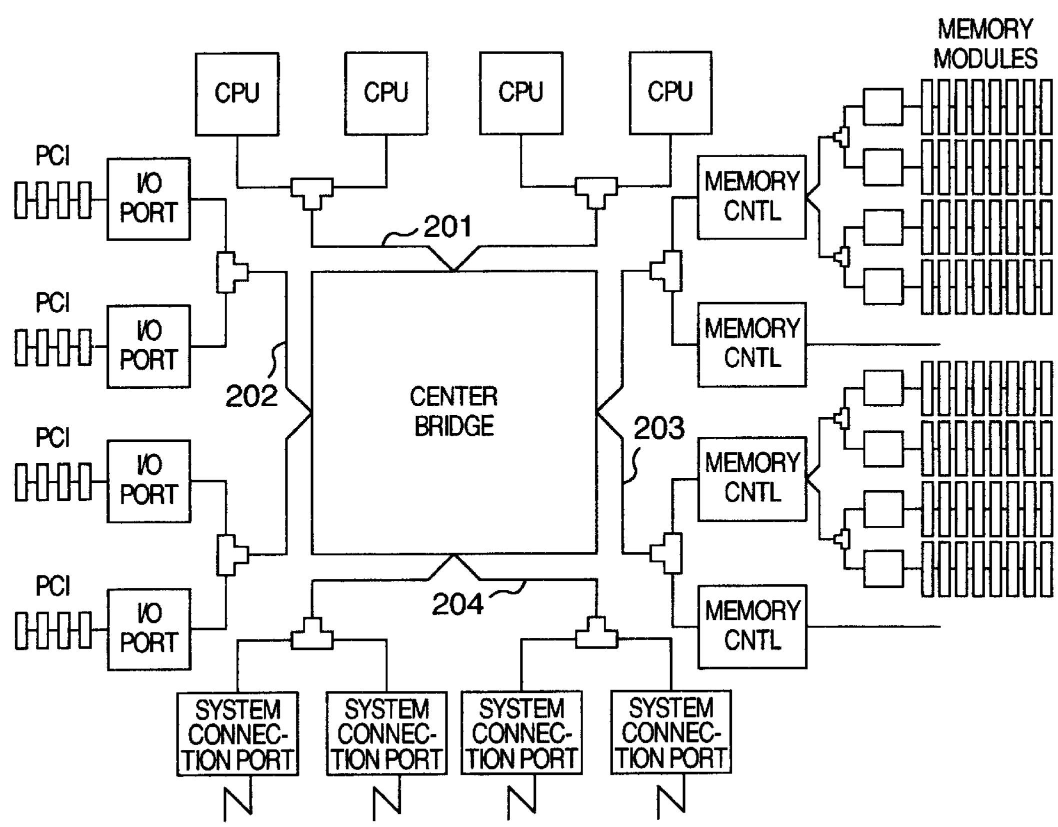
FIG. 24 is a diagram for explaining the third embodiment.

FIG. 24 shows an example of the arrangement of the system using this bus as the fifth embodiment.

As illustrated, four CPUs are interconnected by a processor bus 201. Four memory controllers for controlling DRAM are interconnected by a memory bus 203. In addition, four I/O port LSIs for connecting peripheral equipment such as PCI are interconnected by an I/O bus 202. These buses 201~203 are connected to a center bridge. The center bridge is provided to be connected just at the center of the buses 201~203. Each bus has variable resistors to enable fast data transfer as in the first embodiment.

A module bus 204 is also provided to connect a plurality of CPU modules each of which has these processor bus 201, memory bus 203, I/O bus 202 and center bridge. The module bus 204 interconnects four system connection ports for connecting other CPU modules. These elements can constitute a large-scale multiprocessor. In addition, since data can be fast transferred among those elements, a high-performance system can be constructed.

The arrangement of the first embodiment can achieve no reflection or a low reflection coefficient at branch points even though any one of the LSIa~LSIe is used as a driver, thus making it possible to fast transfer data with low noise. Therefore, the present invention can provide a system capable of fast data transfer.

Moreover, from the principle of operation, it will be understood that transmission lines can transmit thereon data with low distortion and without limiting their lengths if the transmission lines are respectively provided between the variable resistors 1, 2 and LSIa~LSId, and the lines have constant characteristic impedances over their lengths along which the loss can be negligible. As a result, it is not necessary to limit the lengths of the stub lines Ta~Td shown in FIG. 1. That is, the freedom of the structure design increases since the lengths of the lines are not limited.

In addition, since the lines need no terminal resistor, the mounting area can be reduced.

According to the second embodiment, since the output impedances and output voltages in FIG. 6 can be controlled only by C-MOS transistors. Those controllers can be simply incorporated in LSIs. The result is that interfaces can be constructed as shown in the equivalent circuit of FIG. 7.

Moreover, according to the invention, since the LSIs have circuits for adjusting their impedances, the impedances can be set to the target values. Therefore, error of impedance can be removed, which error is caused by scattering of characteristics at the time of manufacturing or by temperature distribution.

According to the third embodiment, high-precision impedance control can be performed by use of inexpensive MOS, and applied to a multi-bit structure. Thus, the mounting area can be reduced.

According to the fourth embodiment, high-precision impedance control can be performed by use of inexpensive MOS, and applied to a multi-bit structure. Thus, the mounting area can be reduced.

What is claimed is:

1. A branch bus system comprising:

three signal lines to be connected at a branch point for transmitting and receiving data; and a variable resistor including three variable resistance elements connected in a Y-letter shape among one ends of said three signal lines, control means for controlling the values of said resistance elements, and two control signal terminals for controlling said control means, wherein said control means responds to a combination of signal values fed from said two control signal terminals to shift the values of said three variable resistance elements so that the values and a predetermined impedance have a constant relation, and wherein said control means performs said shift of the values of said three variable resistance elements during transmission of data on said three signal lines.

2. A branch bus system, comprising:

three signal lines to be connected at a branch point for transmitting and receiving data; and a variable resistor including three variable resistance elements connected in a Y-letter shape among one ends of said three signal lines, control means for controlling the values of said resistance elements, and two control signal terminals for controlling said control means, wherein said control means responds to a combination of signal values fed from said two control signal terminals to shift the values of said three variable resistance elements so that the values and a predetermined impedance have a constant relation, wherein if said three variable resistance element values are represented by ra, rb, rc, and said predetermined impedance by Zo, said constant relation is given by the following table that shows the shift of said resistance element values with respect to combinations of said signal values at said control signal terminals d1 and d2:

| d1 | d2 | ra | rb | rc |
|---|---|---|---|---|
| L | L | ro | r0 | r0 |
| L | H | rh | r1 | r1 |
| H | L | rl | rh | rl |
| H | H | ro | ro | ro |

where ro/Zo/3, rh=Zo, and r1<5Ω.

3. A branch bus system, comprising:

three signal lines to be connected at a branch point for transmitting and receiving data; and a variable resistor including three variable resistance elements connected in a Y-letter shape among one ends of said three signal lines, control means for controlling the values of said resistance elements, and two control signal terminals for controlling said control means, wherein said control means responds to a combination of signal values fed from said two control signal terminals to shift the values of said three variable resistance elements so that the values and a predetermined impedance have a constant relation, and wherein said variable resistance elements each have a plurality of MOS transistors of gate widths w, 2w, 4w, 8w . . . where w is a unit width, connected in parallel, and impedances of said variable resistor are changed by controlling the gate voltages of said MOS transistors.

4. A branch bus system according to claim 3, wherein said variable resistor compares a resultant impedance of said MOS transistors with a reference impedance provided outside said variable resistance elements to decide if said resultant impedance is large or smaller than said predetermined impedance Zo, and selects a proper one of the combinations of said MOS transistors according to said decision, thus generating said reference impedance in each of said variable resistance elements.

5. A branch bus system according to claim 3, wherein said variable resistor makes all of said MOS transistors conductive, thereby generating r1<5Ω in each of said variable resistance elements.

6. A branch bus system according to claim 4, wherein said variable resistor controls gate widths of said MOS transistors to reduce ⅓ of gate widths equivalent to said reference impedance Zo thereby generating r0/Zo/3 in each of said variable resistance elements.

7. An interface circuit formed of a driver and a receiver for transmitting and receiving data, comprising:

means for holding an output impedance of an output connected to the driver equal to a predefined impedance Zo irrespective of whether data is transmitted or received; and means, connected to the output, for setting an output potential of the output to Vh when data having an ON signal (H) is output, setting the output potential of the output to V1 when data having an OFF signal (L) is output, and setting the output potential of the output to Vtt=(Vh−V1)/2 when no data is output, wherein the setting of the output potential of the output is performed during transmission of data.

8. An interface circuit formed of a driver and a receiver for transmitting and receiving data, comprising:

means for holding an output impedance of an output connected to the driver equal to a predefined impedance Zo irrespective of whether data is transmitted or received;

means, connected to the output, for setting an output potential of the output to Vh when data having an ON signal (H) is output, setting the output potential of the output to V1 when data having an OFF signal (L) is output, and setting the output potential of the output to Vtt=(Vh−V1)/2 when no data is output;

means for receiving a data signal and negative logic output enable signal (OE_N) for controlling said interface;

means for changing the output impedance by a plurality of parallel P-MOS transistors connected between a power supply Vcc and an I/O pad and a plurality of parallel N-MOS transistors connected between said I/O pad and ground, said P-MOS and N-MOS transmits being connected in a push-pull manner, and said means for changing being provided at a final stage of said driver; and means for changing the voltage Vio at said I/O pad while the output impedance is kept equal to said predefined impedance Zo by shifting the impedance of said P-MOS, and N-MOS transistors of said driver according to a table of

| data | OE_N | rp | m | Vio |
|---|---|---|---|---|
| L | L | 5 kΩ or above | Zo | 0 |
| L | H | 2Zo | 2Zo | Vcc/2 |
| H | L | Zo | 5 kΩ or above | Vcc |
| H | H | 2Zo | 2Zo | Vcc/2 |

wherein when states of said data signal and output enable signal are represented by data and OE_N, respectively, impedances of said P-MOS and N-MOS transistors of said driver are represented by rp and rn, said predefined impedance is represented by Zo, and no-load said I/O pad output potential is represented by Vio.

9. An interface circuit formed of a driver and a receiver for transmitting and receiving data, comprising:

means for holding an output impedance of an output connected to the driver equal to a predefined impedance Zo irrespective of whether data is transmitted or received;

means, connected to the output, for setting an output potential of the output to Vh when data having an ON signal (H) is output, setting the output potential of the output to V1 when data having an OFF signal (L) is output, and setting the output potential of the output to Vtt=(Vh−V1)/2 when no data is output;

means for changing the output impedance by controlling gate voltages of MOS transistors included in each of two sets of a plurality of parallel MOS transistors, said MOS transistors having gate widths w, 2w, 4w, 8w . . . , where w is a unit gate width; and means for setting the output impedance of each set of MOS transistors to 2Zo, wherein said setting means includes:

means for comparing said output impedances of each set of MOS transistors and a reference impedance provided from outside of said interface circuit, thereby deciding which one of said output impedances is larger than the other; and means for setting a resultant impedance of at least one of P-MOS transistors and N-MOS transistors to said reference impedance by switching the gate voltages for selecting some of said MOS transistors according to a comparison result.

10. An interface circuit formed of a driver and a receiver for transmitting and receiving data, comprising means for holding an output impedance of an output connected to the driver equal to a predefined impedance Zo irrespective of whether data is transmitted or received;

means, connected to the output, for setting an output potential of the output to Vh when data having an ON signal (H) is output, setting the output potential of the output to V1 when data having an OFF signal (L) is output, and setting the output potential of the output to Vtt=(Vh−V1)/2 when no data is output;

two sets of P-MOS transistors and two sets of N-MOS transistors, impedance of each set being a predefined impedance 2Zo; and means for shifting I/O pad voltage Vio while the output impedance is kept equal to the predefined impedance Zo, wherein if one of the two sets is in ON state, the impedance of the two sets becomes 2Zo, wherein if both of the two sets are in ON state, the impedance of the two sets becomes Zo, wherein if both of the two sets in OFF state, the impedance of the two sets becomes high, wherein said shifting means shifts the I/O pad voltage by making:

(a) the impedance of N-MOS transistors Zo, when the impedance of P-MOS transistors is high, the impedance of N-MOS transistors 2Zo, when the impedance of P-MOS transistors is 2Zo, and the impedance of N-MOS transistors high, when the impedance of P-MOS transistors is Zo, or (b) the impedance of P-MOS transistors Zo, when the impedance of N-MOS transistors is high, the impedance of P-MOS transistors 2Zo, when the impedance of N-MOS transistors is 2Zo, and the impedance of N-MOS transistors high, when the impedance of N-MOS transistors is Zo.

* * * * *